US007984001B2

(12) United States Patent
Capece et al.

(10) Patent No.: US 7,984,001 B2
(45) Date of Patent: Jul. 19, 2011

(54) NEURAL NETWORK-BASED EXTENSION OF GLOBAL POSITION TIMING

(75) Inventors: Christopher J. Capece, Lebanon, NJ (US); Behzad D. Mottahed, Upper Montclair, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 875 days.

(21) Appl. No.: 10/686,451

(22) Filed: Oct. 15, 2003

(65) Prior Publication Data

US 2005/0085224 A1    Apr. 21, 2005

(51) Int. Cl.
*G06E 1/00* (2006.01)

(52) U.S. Cl. ............... 706/21; 706/22; 706/25; 706/36; 368/47; 368/4; 368/52; 455/502; 455/13.2; 455/561

(58) Field of Classification Search .......... 455/423, 455/424, 436, 502, 13.2, 574; 370/331; 368/47, 368/4, 52; 706/21, 22, 25, 35
See application file for complete search history.

(56) References Cited

U.S. PATENT DOCUMENTS

| | | | | |
|---|---|---|---|---|
| 6,125,105 | A * | 9/2000 | Edwards et al. | 370/230 |
| 6,324,586 | B1 * | 11/2001 | Johnson | 709/248 |
| 6,456,606 | B1 * | 9/2002 | Terasawa | 370/331 |
| 6,628,968 | B1 * | 9/2003 | Grohn | 455/560 |
| 6,708,041 | B1 * | 3/2004 | Butovitsch et al. | 455/522 |
| 7,299,214 | B2 * | 11/2007 | Martin et al. | 706/21 |
| 2002/0071409 | A1 * | 6/2002 | Proctor, Jr. | 370/335 |
| 2003/0012158 | A1 * | 1/2003 | Jin et al. | 370/335 |

FOREIGN PATENT DOCUMENTS

| | | |
|---|---|---|
| EP | 0 631 453 A2 | 12/1994 |
| EP | 0 815 827 A2 | 1/1998 |
| EP | 0 963 751 A2 | 12/1999 |
| WO | 9705722 | 2/1997 |
| WO | 02093877 A1 | 11/2002 |
| WO | WO 03/061318 A1 | 7/2003 |
| WO | WO 03067463 A2 * | 8/2003 |
| WO | WO 2004/004672 A1 | 1/2004 |

OTHER PUBLICATIONS

1997 IEEE International Frequency Control Symposium publication entitled Test Results and Analysis of a Low Cost Core GPS Receiver for Time Transfer Applications by: J. Blake Bullock, T. Michael King, Howard L. Kennedy, Edward D. Berry and Gregg Zanfino.
European Search Report dated Dec. 30, 2004 relating to EP 04 25 5945.
"Rapid Acquisition by Neural Networks in DS/SS Communication Systems," Lee, et al., International Conference on Neural Information Processing '94, pp. 343-348.

* cited by examiner

*Primary Examiner* — Kent Chang
*Assistant Examiner* — Dung Lam
(74) *Attorney, Agent, or Firm* — Carlson, Gaskey & Olds PC

(57) ABSTRACT

A wireless communication system (20) includes a base station controller (22) that receives timing information from a data set (26) that is generated by a neural network (28). The data set (26) allows for generating timing information based upon previous time information received from a GPS (24) and in one example, is capable of covering a time interval of up to two weeks during which effective communication with the GPS may be interrupted. In one example, the data set is continuously updated so that the base station controller (24) continuously has up to two weeks of future time information available.

20 Claims, 2 Drawing Sheets

NEURAL NETWORK-BASED EXTENSION OF GLOBAL POSITION TIMING

FIELD OF THE INVENTION

This invention generally relates to controlling timing information for a wireless communication system base station. More particularly, this invention relates to generating a data set that is useful for providing future time information for a base station.

DESCRIPTION OF THE RELATED ART

Wireless communication systems are in wide spread use. Typical configurations include areas that are effectively divided into cells. A base station typically is responsible for handling communications for mobile units within a corresponding cell. In some instances, more than one base station may be provided for an individual cell.

Base station controllers rely upon timing information to maintain accurate communications. This is especially true for communications that extend outside of a cell associated with a particular base station. Where the CDMA protocol is used, timing synchronization is critical for continuous and accurate communication.

Timing information typically is provided by a global positioning system (GPS). There are known techniques for gathering timing information and converting that into a useful form to facilitate communications. Synchronization with the GPS provides internal (i.e., base station) and network timing information. Such timing information must be updated on a regular basis through communications with the GPS.

There is the possibility for losing communication with the GPS. It is necessary to maintain accurate timing information during intervals where communication with the GPS is not possible or otherwise not reliable. The internal timers of typical base stations do not provide accurate enough time information to be reliable for more than very brief time periods. Other available sources of information, such as local time information, do not provide globally accurate time information.

Accordingly, there is a need for providing time information at a base station when communication with a GPS is not possible. This invention addresses that need.

SUMMARY OF THE INVENTION

In general terms, this invention is a method of providing timing information at a base station for situations where GPS timing is not available.

One method according to this invention for maintaining time information for a wireless communications base station includes using a neural network for generating a data set that provides future time information.

In one example the data set is useful for a first time interval and the method includes generating another data set for a second, later time interval. In one particular example, the method includes repeatedly generating another data set for subsequent time intervals. By updating the data set on an ongoing basis, it becomes possible to always have a reliable source of time information even when communications with a GPS fail for some time.

In one example, the neural network generates the data set, which comprises a plurality of coefficients for providing future time information based upon a starting time input. In one example, the neural network is trained repeatedly until a desired level of accuracy is provided by a data set.

The various features and advantages of this invention will become apparent to those skilled in the art from the following detailed description. The drawings that accompany the detailed description can be briefly described as follows.

DETAILED DESCRIPTION

Figure 1:
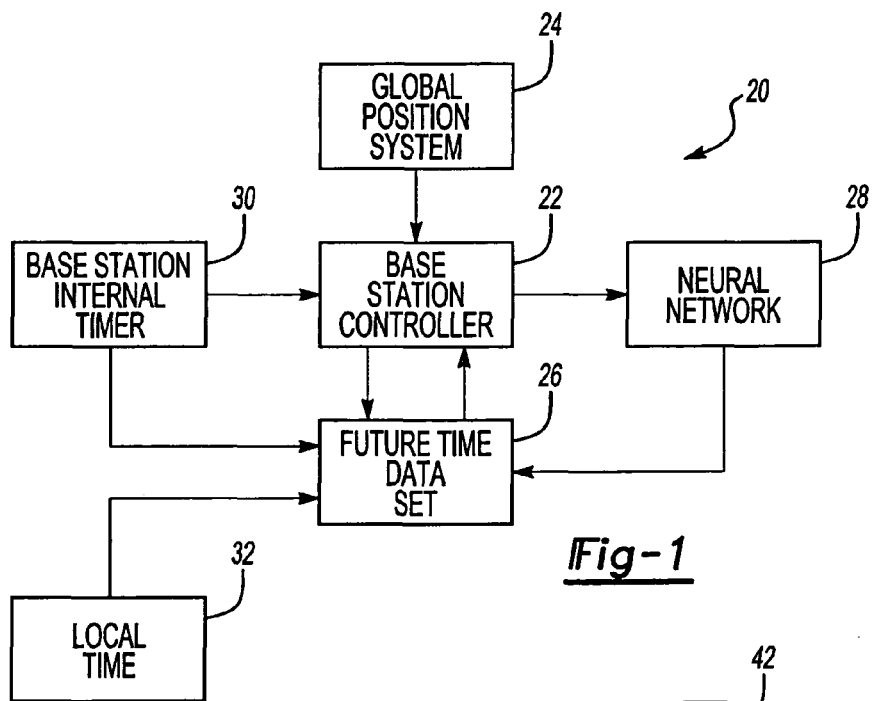
FIG. 1 schematically illustrates selected portions of a wireless communication system including an embodiment of this invention.

FIG. 1 schematically illustrates selected portions of a wireless communication system 20. A base station controller 22 controls communications through a base station in a generally known manner. The base station controller 22 receives timing information from a global position system (GPS) 24 using available techniques. The timing information allows the base station controller 22 to maintain continuous and accurate communications as required within the wireless network.

There are instances where effective communication between the base station controller 22 and the GPS 24 are not possible. For such situations, the illustrated arrangement includes a future time data set 26 for providing time information during intervals where communication with the GPS 24 is lost. A neural network 28 generates the future time data set 26, which in one example includes a plurality of coefficients for providing future time information based upon an input starting time.

When communication between the base station controller 22 and the GPS 24 fails, the base station controller 22 attempts obtain time information from the data set 26. In one example, the controller 22 prompts the data set 26 to begin generating time information. At this junction, the data set 26 requires a starting time input to be processed using the coefficients generated by the neural network 28. The starting time input may come from a base station internal timer 30, which operates in a conventional manner. In another example, local time information is obtained from an external source 32. In still another example, the most recent timing information available from the GPS 24 (i.e., the last received before communication with the GPS was interrupted) is used as the start time for the data set 26 to begin generating time information.

It should be noted that the divisions within FIG. 1 are schematic and for illustration purposes. One or more portions of the illustration may be incorporated into existing portions of a base station controller or may be separate components. For example, the neural network 28 and the storage of the data set 26 may be incorporated into a base station controller hardware, firmware or software. Those skilled in the art who have the benefit of this description will realize how to utilize software, hardware, firmware or a combination of these to achieve the functions provided by the schematically shown portions of the system 20 discussed in this description.

The data set 26 allows for the base station controller 22 to obtain time information even though communication with the GPS 24 is interrupted. The base station 22 is able to determine when communication with the GPS is unavailable and to then obtain timing information from the data set 26. The data set 26 is provided with time information regarding a starting time for the interval during which the time information must be generated and provided to the base station controller 22. In one example, the data set 26 continues providing information to the base station controller 22 until the controller determines that communication with the GPS 24 is again available.

The base station controller 22 preferably obtains time information from the data set 26 for the entire interval during which the communication with the GPS 24 is lost. In one example, the data set 26 is capable of providing up to two weeks of future time information to cover extended interruptions in communications with the GPS 24. This represents a substantial advancement beyond any available means for providing estimated time information to a base station controller 22 in a manner accurate enough to enable proper communication.

Figure 2:
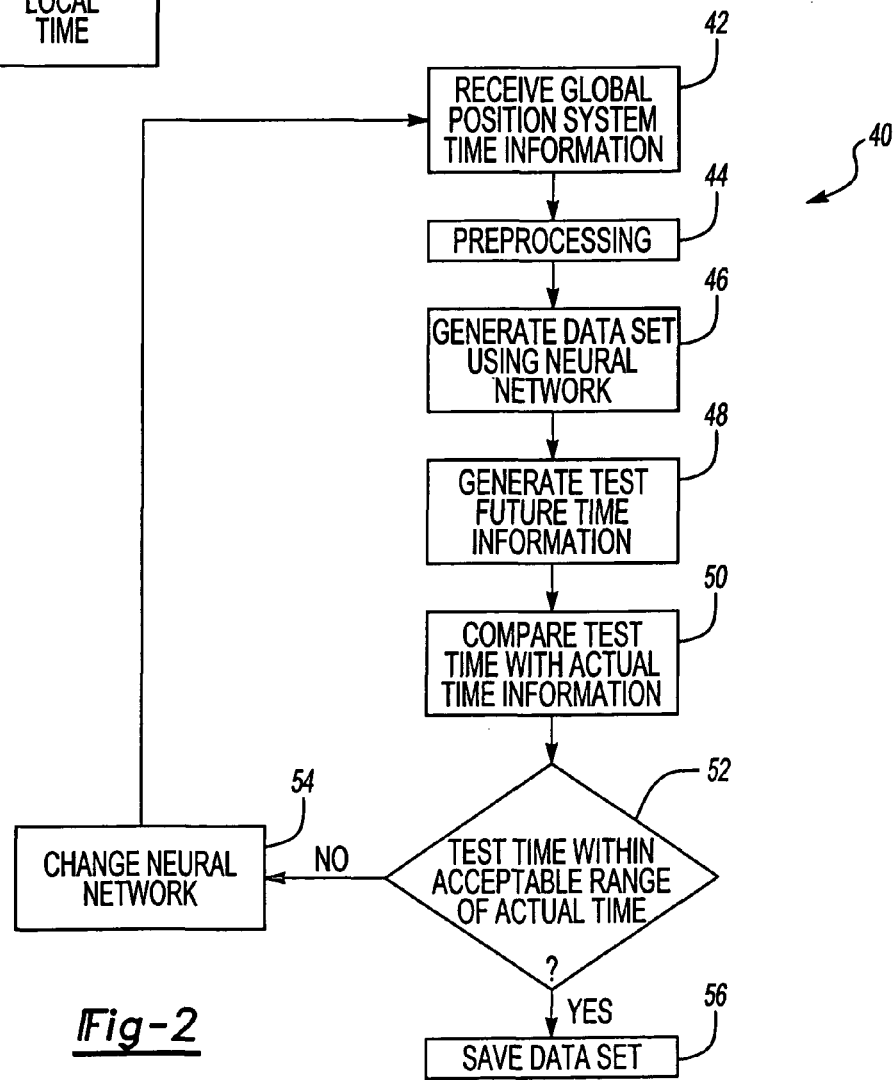
FIG. 2 is a flow chart diagram summarizing a process of generating a data set designed according to this invention.

Referring to FIG. 2, the neural network 28 generates the data set 26 based upon input received from the GPS 24. The flow chart 40 of FIG. 2 summarizes the following example process of generating the data set 26.

At 42, global position system time information is collected by an appropriate portion of the base station controller 22. The amount of time information collected depends upon the desired accuracy and length of time to be covered by the data set 26. The gathered information in this example is preprocessed at 44 to place it into a format that is more speedily handled by the neural network 28. Once receiving the information, the neural network 28 learns and generates the data set at 46.

Known neural network techniques allow for generating a data set 26 of coefficients that effectively provide a curve fitting function that provides predicted or future time information based upon some initial time input. Neural networks are known and their function and capabilities are sufficiently known that those skilled in the art who have the benefit of this description will be able to choose an appropriate neural network architecture and processing techniques to generate a data set that meets the needs of their particular situation.

According to the example of FIG. 2, test future time information is generated at 48. In one example, the GPS time information for a particular time interval is collected and stored. The data set 26 generated by the neural network 28 then is prompted to generate time information for a corresponding time interval. The results from the data set (i.e., the test time information) and the actual collected GPS timing information then are compared at 50. The results of the comparison provide an indication of the accuracy with which the data set predicts future time information. At 52, any difference between the test time information and the actual time information is compared to a selected threshold or margin of error.

If the differences between the test time information and the actual time information are not within an acceptable range at 54, the neural network is changed to increase the accuracy or complexity of the neural network. In one example, a change to the neural network includes increasing the number of layers within the network. It is known that increasing layers increases accuracy within a neural network while also increasing the processing time of the network. Accordingly, there is some tradeoff between the number of layers and the processing time and those skilled in the art who have the benefit of this description will be able to choose appropriate parameters for each to meet the needs of their particular situation.

In another example, the complexity of the network is changed by increasing the number of neurons within the network. Other complexity changes are within the scope of this invention.

The changes to the neural network at 54 preferably result in increased accuracy so that the next test between actual time information and the test time information includes minor differences that are within an acceptable range or, even better, an exact match. Once an appropriate level of accuracy is required, the data set 26 is saved at 56.

Figure 3:
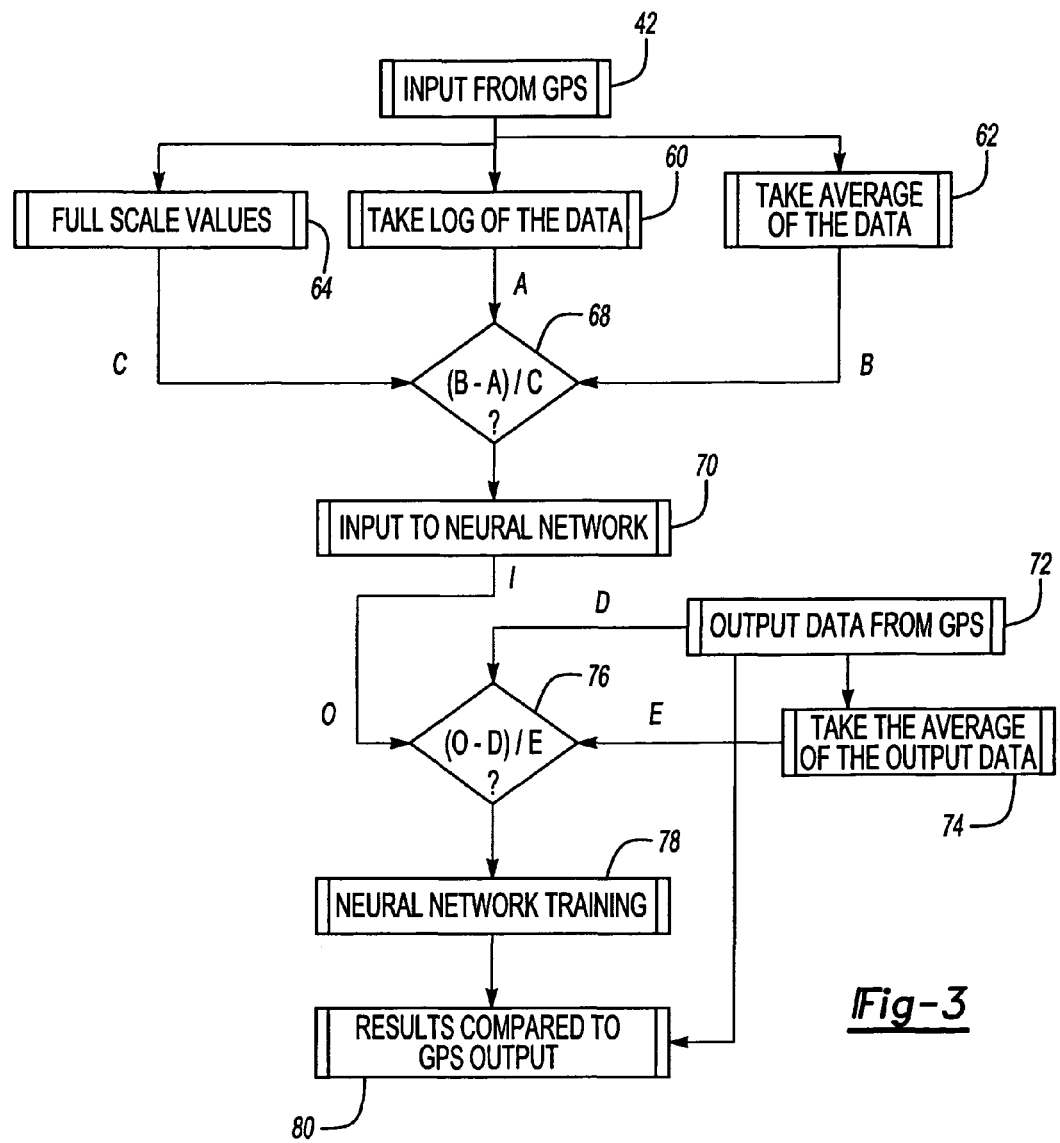
FIG. 3 is a flow chart diagram illustrating one embodiment of selected portions of the process summarized in FIG. 2.

FIG. 3 schematically illustrates, in flow chart form, one example implementation for training the neural network 28 to reach a desired level of accuracy when producing the data set 26. Like the flow chart in FIG. 2, that in FIG. 3 includes receiving timing information from the GPS at 42. The preprocessing referred to at 44 in FIG. 2 includes the steps shown at 60-68 in FIG. 3. This example includes taking a log of the data at 60, determining an average of the data at 62 and utilizing full scale values of the data at 64. These values are combined at 68 and, in this particular example, a difference between the average of the data and the log of the data is divided by the full scale value of the data. This provides a preprocessing output I, which is input to the neural network at 70. Preprocessing the data in this manner places the data into a format that is more readily handled by the neural network to speed processing. Those skilled in the art who have the benefit of this description will be able to select appropriate preprocessing as may be needed to meet the needs of their particular situation.

The neural network provides an output O, which is combined with data from the GPS at 72 and an average of that data is determined at 74. The output O from the neural network in this example is divided by the output data from the GPS and the result is then divided by the average of the output data available at 74. The resulting information is provided for neural network training at 78 to determine how much neural network processing is required to achieve a desired level of accuracy for the data set 26. The amount of training will depend upon the amount of accuracy required and the amount of data that is provided to the neural network. The neural network 28 preferably is trained, using known techniques, until sufficiently accurate results are obtained. That accuracy is determined by comparing the results from the generated data set with the GPS timing information at 80.

One example implementation of this invention includes repeatedly training the neural network to obtain the desired level of accuracy. Another example feature of an implementation of this invention is to continuously update the data set 26 so that a reliable set of coefficients are effectively always available to address any situations where communication with the GPS 24 becomes interrupted.

Figure 4:
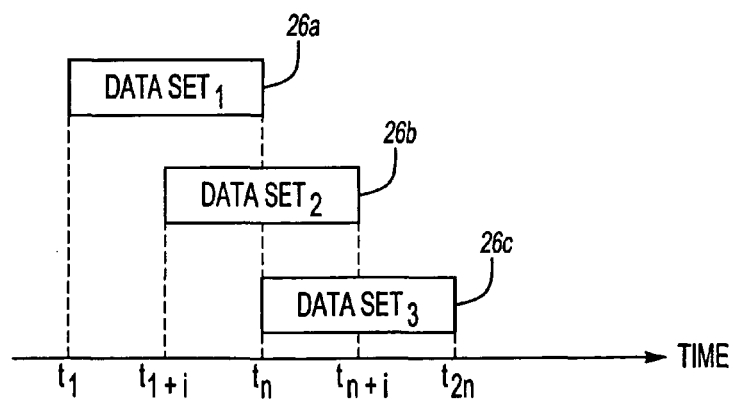
FIG. 4 is a timing diagram schematically illustrating an example approach to generating data sets on an ongoing basis.

FIG. 4 schematically illustrates one strategy for continuously updating the data set 26. A first data set 26A is generated by the neural network 28, which provides coefficients that are effective for providing time information over an interval beginning at a time $T_1$ and extending into the future up to a time $T_n$. The Time $T_1$ depends on when the data set 26 is generated based on GPS input as described above. Based upon the amount of training and the known parameters of the neural network 28, the base station controller 22 would be able to obtain time information from the data set 26 for a period beginning at or after $T_1$ and extending up to the time $T_n$. In one example, the data set is updated so that the base station controller 22 always has the ability to obtain time information over a time interval the size of the interval extending from $T_1$ to $T_n$. In one example, the time between $T_1$ and $T_n$ is approximately two weeks.

Subsequent to when the data set 26A is generated, the neural network 28 receives updated GPS time information and generates a data set 26B that extends from a time $T_{1+i}$ to a time $T_{n+i}$. The length of the time interval covered by the second data set 26B is the same as that covered by the first data set 26A although the time of coverage is future compared to that for the data set 26A. Another data set can later be generated to cover the time interval extending from $T_n$ to $T_{2n}$. Such a data set is shown at 26C in FIG. 4.

The amount of overlap between the data sets can be selected to meet the needs of a given situation. In one example, when a subsequent data set is generated, the previous data set may be discarded. For example, in FIG. 4 when the data set 26B is generated, that replaces the data set 26A. In another example, multiple data sets are maintained where they overlap for a particular period so that the results from each may be used to determine accurate time information.

This invention provides the ability to obtain time information for a base station controller based upon previous global position time information so that the base station can operate based upon accurate global position time information even though communication with a GPS has been interrupted. This invention readily and reliably provides such timing information for intervals that far exceed the capabilities of prior approaches. For example, internal timers associated with base station controllers may provide information for up to eight hours, but that timing information is not necessarily reliable and certainly not beyond such a brief time. By contrast, one example embodiment of this invention provides accurate information consistent with or corresponding to actual GPS timing information for a period of up to two weeks.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of maintaining time information for a wireless communications base station, comprising:
   using time information provided to a neural network for generating a data set that provides future time information; and
   selectively using time information from the data set for conducting a communication involving the base station,
   wherein the data set comprises a plurality of coefficients for generating future time information based upon a start time.

2. The method of claim 1, wherein the data set is useful for a first time interval and including generating another data set for a second, later time interval.

3. The method of claim 2, including repeatedly generating another data set for subsequent time intervals.

4. The method of claim 1, including
   gathering time information from an external source;
   inputting the gathered time information to the neural network; and
   generating the data set based upon the inputted time information.

5. The method of claim 4, wherein the gathered time information extends over a selected period and including
   comparing time information from the data set for a period corresponding to the selected period with the gathered time information; and
   changing at least one characteristic of the neural network when the data set time information does not correspond to the gathered time information within a selected range.

6. The method of claim 5, including changing the characteristic of the neural network by changing at least one of a number of layers in the neural network, a number of neurons in the neural network or a complexity factor of the neural network.

7. The method of claim 5, including repeatedly performing the steps of comparing and changing until the data set time information corresponds to the gathered time information within the selected range.

8. The method of claim 1, including
   receiving time information from an external source;
   determining when the external source time information is not available; and
   using the data set for time information when the external source time information is not available.

9. The method of claim 8, including using an initialization time value and the data set to generate time information until the external source time information becomes available.

10. The method of claim 8, wherein the external source time information comprises global position system time information.

11. The method of claim 1, including providing at least more than 24 hours of future time information using the data set.

12. The method of claim 11, including providing at least two weeks of future time information using the data set.

13. The method of claim 1, wherein the data set corresponds to global position system time information.

14. A wireless communication device, comprising:
   a neural network that generates a data set for providing future time information; and
   a base station controller that determines time information from a global position system (GPS) source of time information and uses the data set for obtaining time information if the GPS source is unavailable to the base station controller,
   wherein the data set comprises a plurality of coefficients for generating future time information based upon a start time.

15. The device of claim 14, wherein the data set is useful for a first time interval and the neural network generates another data set for a second, later time interval.

16. The device of claim 15, wherein the neural network repeatedly generates another data set for subsequent time intervals.

17. The device of claim 14, wherein the neural network receives an input of gathered time information and generates the data set based upon the inputted time information.

18. The device of claim 14, wherein the data set provides at least more than 24 hours of future time information.

19. The device of claim 18, wherein the data set provides at least two weeks of future time information.

20. The device of claim 14, wherein the data set corresponds to GPS time information.

* * * * *